United States Patent [19]
Nishimura et al.

[11] Patent Number: 6,130,301
[45] Date of Patent: *Oct. 10, 2000

[54] METHOD FOR PRODUCING POLYOLEFIN

[75] Inventors: Sadaki Nishimura; Hideyuki Takitani, both of Yokkaichi; Yutaka Naito, Mie-ken; Mitsuhiro Mori, Aichi-ken, all of Japan

[73] Assignee: Tosoh Corporation, Yamaguchi-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/923,407

[22] Filed: Sep. 4, 1997

Related U.S. Application Data

[63] Continuation of application No. 08/683,912, Jul. 19, 1996, abandoned, which is a continuation of application No. 08/281,089, Jul. 27, 1994, abandoned.

[30] Foreign Application Priority Data

Jul. 28, 1993 [JP] Japan ..................................... 5-185987

[51] Int. Cl.$^7$ ................ C08F 4/649; C08F 4/58
[52] U.S. Cl. ..................... 526/124.8; 526/124.7; 526/153; 526/907
[58] Field of Search ............. 526/124.7, 124.8, 526/907, 153

[56] References Cited

U.S. PATENT DOCUMENTS

| | | | |
|---|---|---|---|
| 3,901,863 | 8/1975 | Berger et al. | 526/352 |
| 4,105,846 | 8/1978 | Hoff et al. | 526/352 |
| 4,525,554 | 6/1985 | Tanaka et al. | 526/124 |
| 4,588,704 | 5/1986 | Drake et al. | . |
| 4,617,360 | 10/1986 | Bienfoit | 526/908 |
| 4,804,726 | 2/1989 | Kondo et al. | . |
| 5,229,476 | 7/1993 | Hara et al. | 526/119 |

FOREIGN PATENT DOCUMENTS

| | | |
|---|---|---|
| 475134 | 3/1992 | European Pat. Off. . |
| 0522423 | 1/1993 | European Pat. Off. . |
| 522423 | 1/1993 | European Pat. Off. . |
| 0544340 | 6/1993 | European Pat. Off. . |
| 0567286 | 10/1993 | European Pat. Off. . |
| 2656313 | 6/1991 | France . |
| WO9207008 | 4/1992 | WIPO . |

*Primary Examiner*—Fred Teskin
*Attorney, Agent, or Firm*—Sughrue, Mion, Zinn, Macpeak & Seas, PLLC

[57] ABSTRACT

A method for producing a polyolefin, which comprises polymerizing or copolymerizing at least one olefin in the presence of a catalyst system comprising (A) a solid catalyst component of a titanium catalyst component obtained by reacting at least one aluminum halide compound with a homogeneous solution containing magnesium, titanium and alkoxy groups, wherein the aluminum halide compound is added to the homogeneous solution to provide a halogen atom in a mol ratio of from 0.2 to 0.4 to one mol of the alkoxy groups contained in the homogeneous solution to precipitate particles in the former step, and the aluminum halide compound is further added to provide a halogen atom in a mol ratio of from 1 to 20 to one mol of the alkoxy groups to treat the resultant mixture containing the precipitated particles in the latter step, and (B) at least one organic aluminum compound catalyst component.

6 Claims, 1 Drawing Sheet

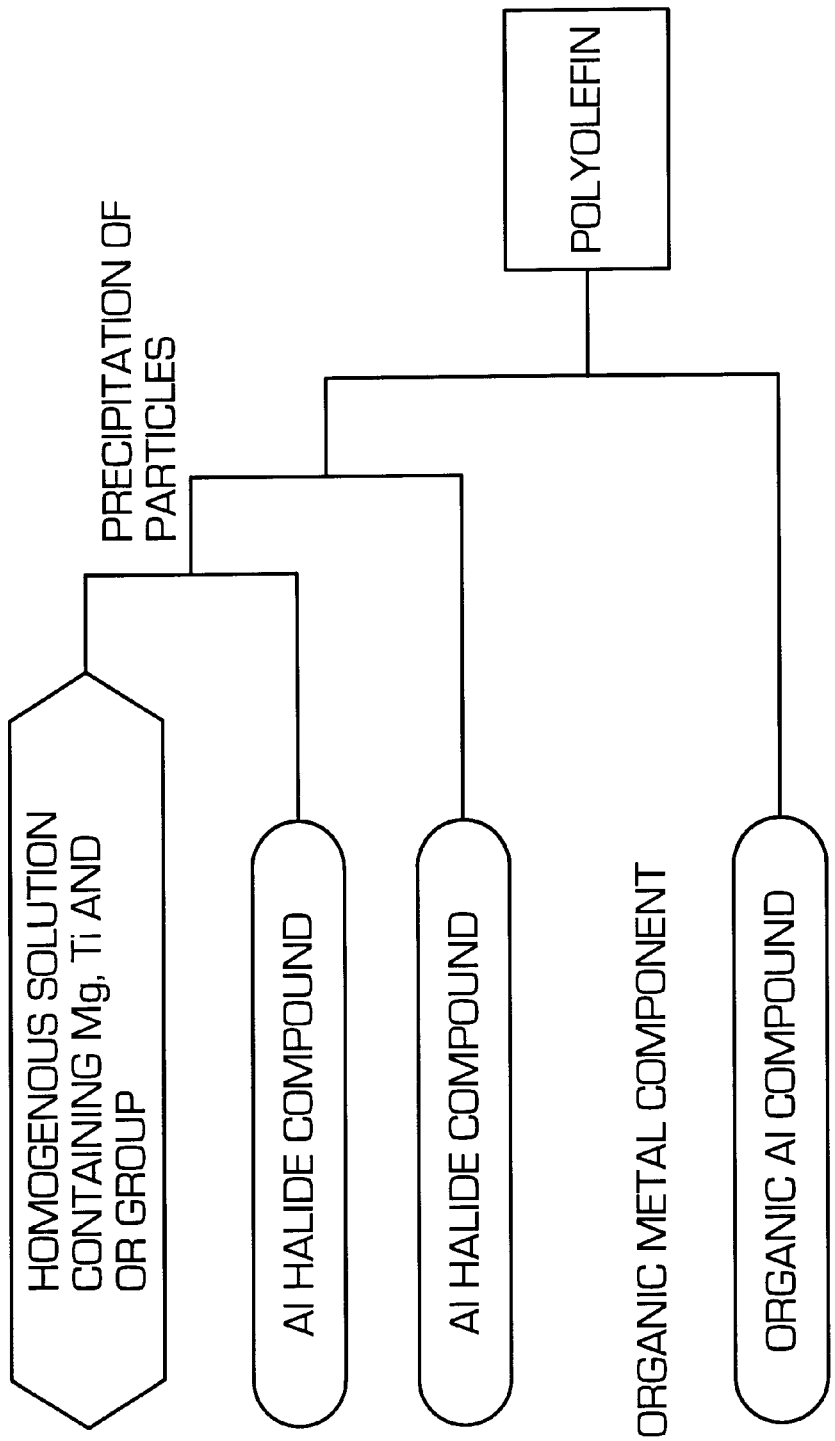

METHOD FOR PRODUCING POLYOLEFIN

This is a Continuation of application Ser. No. 08/683,912 filed Jul. 19, 1996, now abandoned, which is a Continuation of application Ser. No. 08/281,089 filed Jul. 27, 1994, now abandoned.

BACKGROUND OF THE INVENTION

1. Field of the Invention

The present invention relates to a method for producing a polyolefin by polymerizing or copolymerizing at least one olefin in the presence of a novel catalyst system. More particularly, the present invention relates to a method for producing a polyolefin having excellent qualities including powder properties at a very high activity as compared with conventional methods.

2. Discussion of Background

It is already known to use a catalyst system comprising a transition metal compound and an organic metal compound in low pressure polymerization of olefins. Also, a catalyst system containing an inorganic or organic magnesium compound and a transition metal compound is known as a highly active catalyst.

For example, Japanese Examined Patent Publication No. 15110/1977 discloses a highly active catalyst system comprising a catalyst component (A) obtained by reacting magnesium metal with a hydroxylated organic compound or an oxygen-containing organic compound of magnesium, an oxygen-containing organic compound of a transition metal and a halogenated aluminum compound, and a catalyst component (B) of an organic metal compound.

However, activities of these catalyst systems are till insufficient, and polymer particles obtained thereby have various disadvantageous powder properties in that average particle sizes are small, that particle size distributions are broad and that the proportions of fine particles contained in polymer particles are large.

Thus, the above-mentioned disadvantages sometimes provide problems such as a catalyst residue remains in a polyolefin in a large amount, thereby coloring the polyolefin and degrading weather resistance of the polyolefin, and that various troubles are caused at the steps of powder transportation and granulation, thus sometimes making long term-continuous production impossible. Also, in slurry polymerization, separation of particles from a polymer slurry and drying of powder are not easy, and in gas phase polymerization, a production step is blocked by powders. Moreover, in preparation of a polymer by multi-stage polymerization, if a particle size distribution of polymer particles is broad, powders are easily classified at a blending stage of additives or at a transportation stage and a harmful influence is brought on qualities since properties vary depending on a particle size.

It is disclosed in Japanese Examined Patent Publication No. 58367/1987 that a particle size of a polymer can be made large by adding a silicon compound to the starting material of the above-mentioned catalyst component (A), but the catalyst activity and the particle size distribution are not improved.

Under these circumstances, we found and described in Japanese Unexamined Patent Publication No. 309505/1992 that a particle size distribution and a particle size of a polyolefin can be improved by using a catalyst obtained by making ethylene and/or an α-olefin other than ethylene in contact with and absorbed in a solid component containing titanium, but catalyst activity is still poor.

An object of the present invention is to improve catalyst activity without impairing the above-mentioned properties of the catalyst disclosed in Japanese Unexamined Patent Publication No. 309505/1992.

In order to solve the above-mentioned problems, we have studied and discovered that a satisfactory catalyst activity as well as satisfactory powder properties of a polyolefin product can be obtained by using a solid titanium catalyst component obtained by (i) precipitating particles by reacting at least one aluminum halide compound with a homogeneous solution containing magnesium, titanium and alkoxy groups, in such an amount as to provide the halogen of the aluminum halide compound to the alkoxy groups contained in the homogeneous solution within a specific molar ratio range, and (ii) further treating the resultant mixture containing the precipitated particles with at least one aluminum halide compound. The present invention has been made on the basis of this discovery.

SUMMARY OF THE INVENTION

The present invention provides a method for producing a polyolefin, which comprises polymerizing or copolymerizing at least one olefin in the presence of a catalyst system comprising (A) a solid catalyst component of a titanium catalyst component obtained by reacting at least one aluminum halide compound with a homogeneous solution containing magnesium, titanium and alkoxy groups, wherein the aluminum halide compound is added to the homogeneous solution to provide halogen atom in a mol ratio of from 0.2 to 0.4 to one mol of the alkoxy groups contained in the homogeneous solution to precipitate particles in the former step, and the aluminum halide compound is further added to provide a halogen atom in a mol ratio of from 1 to 20 to one mol of the alkoxy groups to treat the resultant mixture containing the precipitated particles in the latter step, and (B) at least one organic aluminum compound catalyst component.

BRIEF DESCRIPTION OF THE DRAWING

FIG. 1 is a flow chart illustrating the catalyst preparation step in the present invention.

DETAILED DESCRIPTION OF THE PREFERRED EMBODIMENTS

Examples of a homogeneous solution containing magnesium, titanium, and alkoxy groups used in the preparation of a solid catalyst component (A) in the present invention, are illustrated in Japanese Examined Patent Publication No. 15110/1977, Japanese Examined Patent Publication No. 58367/1987, and Japanese Unexamined Patent Publication No. 309505/1992. For instance, the solid catalyst component (A) can be prepared by using a homogeneous solution containing (i) at least one member selected from the group consisting of (a) metallic magnesium and at least one alcohol and (b) at least one oxygen-containing organic compound of magnesium, and (ii) at least one oxygen-containing organic compound of titanium, and optionally (iii) at least one silicon compound.

Examples of (a) the metallic magnesium and alcohol, and (b) the oxygen-containing organic compound of magnesium are illustrated hereinafter.

In the case of using (a) the metallic magnesium and alcohol, the metallic magnesium can be used in various forms such as powder, particle, foil or ribbon, and examples of the alcohol include linear or branched aliphatic alcohols, cycloaliphatic alcohols, and aromatic alcohols, having from 1 to 18 carbon atoms. Particular examples of the alcohol include methanol, ethanol, n-propanol, i-propanol, n-butanol, i-butanol, n-hexanol, 2-ethylhexanol, n-octanol, i-octanol, n-stearyl alcohol, cyclopentanol, cyclohexanol, ethylene glycol and the like. These alcohols may be used alone or in a mixture of two or more. When using metallic magnesium for preparing the solid catalyst component (A), it is preferable for accelerating reaction to use a material for reacting with the metallic magnesium or for forming an adduct, for example, one or two or more polar materials such as iodines, alkyl halides, organic acid esters and organic acids.

Examples of (b) the oxygen-containing organic compound of magnesium include magnesium alkoxides such as magnesium methylate, magnesium ethylate, magnesium isopropylate, magnesium decanolate, magnesium methoxyethylate and magnesium cyclohexanolate; magnesium alkylalkoxides such as magnesium ethylethylate; magnesium hydroalkoxides such as magnesium hydroxymethylate; magnesium phenoxides such as magnesium phenolate and magnesium naphtholate; magnesium carboxylates such as magnesium acetate, magnesium stearate, magnesium benzolate, magnesium phenylacetate, magnesium phthalate, magnesium acrylate and magnesium oleate; magnesium enolates such as magnesium acetylacetonate; and complex alkoxides of magnesium-other metal such as $Mg[Al(OC_2H_5)_4]_2$. These oxygen-containing organic magnesium compounds may be used alone or in a mixture of two or more.

A typical example of (ii) the oxygen-containing compound of titanium is a compound having the formula $[TiO_a(OR^1)_b]_m$, wherein $R^1$ is a $C_1$–$C_{20}$, preferably $C_1$–$C_{10}$, hydrocarbon group such as a linear or branched alkyl group, a cycloalkyl group, an arylalkyl group, an aryl group and an alkylaryl group, and a and b are numbers of $a \geq 0$ and $b > 0$ which are compatible with the atomic valence of titanium, and m is an integer. Among them, it is preferable to use an oxygen-containing compound of titanium wherein a is $0 \leq a \leq 1$ and m is $1 \leq m \leq 6$. Preferable examples of the oxygen-containing organic compound of titanium include titanium tetraethoxide, titanium tetra-n-propoxide, titanium tetra-i-propoxide, titanium tetra-n-butoxide, hexa-i-propoxy dititanate, and the like. An oxygen-containing organic compound having a few different hydrocarbon groups may be used, and these oxygen-containing organic compounds of titanium may be used alone or in a mixture of two or more.

Examples of (iii) the silicon compound include polysiloxanes and silanes as illustrated below.

A typical example of a polysiloxane includes a linear, cyclic or tridimensional structure siloxane polymer having one or two or more repeating units in a molecule in various ratios or distributions, the repeating unit being expressed by the formula,

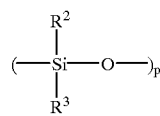

wherein $R^2$ and $R^3$ are a hydrocarbon group such as a $C_1$–$C_{12}$ alkyl group and an aryl group, a hydrogen atom, a halogen atom, a $C_1$–$C_{12}$ alkoxy group, an aryloxy group and an aliphatic acid residue, which can be bonded with silicon, and $R^2$ and $R^3$ may be the same or different (such a case that all of $R^2$ and $R^3$ are hydrogen or halogen are excluded), and p is an integer of from 2 to 10,000.

Examples of the linear polysiloxane include hexamethyldisiloxane, octamethytrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxypolysiloxane, diethoxypolysiloxane, diphenoxypolysiloxane, and the like.

Examples of the cyclic polysiloxane include hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane, octaphenylcyclotetrasiloxane, and the like.

Examples of the tridimensional structure polysiloxane include a polysiloxane having a crosslinking structure obtained by heating the above-mentioned linear or cyclic polysiloxane.

It is preferable for easy handling that these polysiloxanes are liquid, and that they have a viscosity of 25° C. of from 1 to 10,000 centistokes, preferably from 1 to 1,000 centistokes. However, it is not always necessarily a liquid, and a solid material such as silicone grease may be used.

Examples of the silanes include a silicon compound having the formula $H_qSi_rR^4{}_sX_t$ (wherein $R^4$ is a hydrocarbon group such as a $C_1$–$C_{12}$ alkyl group and an aryl group, a $C_1$–$C_{12}$ alkoxy group, an aryloxy group, an aliphatic acid residue, and the like, which can be bonded with silicon, each $R^4$ may be the same or different, X is the same or different halogen atoms, q, s and t are an integer of 0 or more, and r is a natural number, provided that q+s+t=2r+2 or 2r).

Examples of the silanes include silane hydrocarbons such as trimethylphenylsilane, dimethyldiphenylsilane and aryltrimethylsilane; linear or cyclic organic silanes such as hexamethyldisilane and octaphenylcyclotetrasilane; organic silanes such as methylsilane, dimethylsilane and trimethylsilane; silicon halides such as silicon tetrachloride and silicon tetrabromide; alkyl or aryl halogenosilanes such as dimethyldichlorosilane, diethyldichlorosilane, n-butyltrichlorosilane, diphenydichlorosilane, triethylfluorosilane and dimethyldibromosilane; and alkoxysilanes such as trimethylmethoxysilane, dimethyldiethoxysilane, methyltrimethoxysilane, tetramethoxysilane, tetraethoxysilane, diphenyldiethoxysilane, tetramethyldiethoxydisilane and dimethyltetraethoxydisilane; haloalkoxysilanes or halophenoxysilanes such as dichlorodiethoxysilane, dichlorodiphenylsilane and tribromoethoxysilane; silane compounds containing an aliphatic acid residue such as trimethylacetoxysilane, diethyldiacetoxysilane and ethyltriacetoxysilane, and the like. Among them, preferable examples include linear polysiloxanes such as dimethylpolysiloxane and methylhydropolysiloxane; and alkoxysilanes such as methyltrimethoxysilane, tetramethoxysilane and tetraethoxysilane.

The above-mentioned organic silicon compounds may be used alone or in a mixture of two or more.

The homogeneous solution containing magnesium, titanium, and alkoxy groups used in the present invention, can be prepared by reacting (i) at least one member selected from the group consisting of (a) metallic magnesium and at least one alcohol, and (b) at least one oxygen-containing organic compound of magnesium, with (ii) at least one oxygen-containing organic compound of titanium, and optionally with (iii) at least one silicon compound, in any order so long as chemical reaction is caused. For instance, there are many methods such as a method of adding titanium compounds to magnesium compounds, a method of adding silicon compounds to a mixture of magnesium compounds and titanium compounds, a method of mixing magnesium compounds, titanium compounds and silicon compounds at the same time, and a method of adding titanium compounds to magnesium compounds and silicon compounds.

The amounts of the respective reactants of magnesium, titanium, and optionally silicon used in the present invention, are not especially limited, but the atomic ratio of Mg gram atom of the magnesium compound and Ti gram atom of the titanium compound is preferably $1/20 \leq Mg/Ti \leq 100$, more preferably $1/2 \leq Mg/Ti \leq 10$. If the Mg/Ti ratio is larger than the above range, it becomes difficult to obtain a homogeneous Mg—Ti solution in the preparation of a catalyst, and the activity of a catalyst in polymerization becomes low. On the other hand, if the Mg/Ti ratio is smaller than the above range, the activity of a catalyst becomes low and there is a fear that the product is colored.

When a silicon compound is used, the atomic ratio of Si gram atom of the silicon compound and Mg gram atom of the magnesium compound is preferably $1/20 \leq Mg/Si \leq 100$, more preferably $1/2 \leq Mg/Si \leq 10$. If the Mg/Si ratio is smaller than the above range, the activity of a catalyst becomes low.

The present invention employs a solid catalyst component (A) obtained by preparing a homogeneous solution as mentioned above, adding a specific amount of a halogenating agent such as an aluminum halide to the homogeneous solution to precipitate particles in the former step, and further adding the halogenating agent to further halogenate the resultant mixture containing the precipitated particles in the latter step.

The aluminum halide compound used in the present invention is expressed by the formula, $R^5{}_z AlX_{3-z}$ wherein $R^5$ is a $C_1$–$C_{20}$, preferably $C_1$–$C_8$, hydrocarbon group, X is a halogen atom, and z is $0<z<3$, preferably $0<z\leq 2$. $R^5$ is preferably selected from the group consisting of a linear or branched alkyl group, a cycloalkyl group, an arylalkyl group, an aryl group and an alkylaryl group.

Examples of the organic aluminum halide compound include dimethylaluminum chloride, diethylaluminum chloride, diethylaluminum bromide, dipropylaluminum chloride, ethylaluminum dichloride, i-butylaluminum dichloride, methylaluminum sesquichloride, ethylaluminum sesquichloride, i-butylaluminum sesquichloride, and a mixture of triethylaluminum and aluminum trichloride.

The above-mentioned organic aluminum halide may be used alone or in a mixture of two or more to precipitate particles by reaction of an aluminum halide with the homogeneous solution in the former step. In order to provide a satisfactory catalyst activity and satisfactory powder properties, it is necessary to appropriately select the amount and the type of the organic aluminum halide used at this stage. It is preferable for this purpose to use a mixture of two types of organic aluminum halides in a specific ratio. For example, it is preferable to select an organic halide wherein z is $1 \leq z \leq 2$, preferably $1.5 < z < 2$.

The amount of the aluminum halide used in the former step is selected so as to provide from 0.2 to 0.4 mol of a halogen atom to one mol of an alkoxy group contained in the homogeneous solution (hereinafter referred to as "X1/OR"). The amount in the above-mentioned range is suitable for providing particles having a high catalyst activity and satisfactory powder properties when producing particles precipitated by exchange reaction between alkoxy groups of the magnesium and titanium compounds in the homogeneous solution and a halogen atom of the aluminum halide to make magnesium and titanium insoluble. Thus, if z is smaller than the above-mentioned range, particles are hardly precipitated in the former step and a satisfactory high catalyst activity can not be obtained, thus producing a polyolefin powder having a broad particle size distribution. On the other hand, if z is larger than the above-mentioned range, particles precipitated in the former step are not uniform and a catalyst activity is low, thus producing a polyolefin containing a large amount of fine particles having a small average particle size. Also, if the X1/OR value is smaller than the above-mentioned range, satisfactory particles are not precipitated in the former step and a catalyst activity is low, thus producing a polyolefin having a broad particle size distribution. On the other hand, if the X1/OR value is larger than the above-mentioned range, a catalyst activity is low, and a polyolefin containing a large amount of fine particles having a small average particle size is produced.

In the latter step after precipitating particles, an organic aluminum halide is added in such an amount as to provide from 1 to 20 mols of a halogen atom to one mol of alkoxy groups contained in the homogeneous solution (hereinafter referred to as "X2/OR"). A solid catalyst component (A) used in the present invention can be obtained by halogenation conducted in this manner. If the X2/OR value is less than 1 or more than 20, a catalyst produced thereby has a low polymerization activity.

The above-mentioned preparation of a solid catalyst component (A) is conducted preferably in a liquid solvent. Therefore, when these reactants are not liquid under operation conditions, or when the amount of a liquid reactant is insufficient, the reaction should be conducted in the presence of an inert organic solvent. Any of inert organic solvents generally used in this technical field can be used. Examples of the inert organic solvents include aliphatic, cycloaliphatic or aromatic hydrocarbons or their halogen derivatives or their mixtures, such as isobutane, hexane, heptane, cyclohexane, benzene, toluene, xylene, monochlorobenzene and a mixture thereof.

The reaction conditions at each step are not especially limited, but the reaction is conducted generally at a temperature of from –50° C. to 300° C., preferably from 0° C. to 200° C., for 0.5 to 50 hours, preferably from 1 to 6 hours, under a pressure of normal pressure or an elevated pressure in an inert gas atmosphere. In order to produce satisfactory particles, it is preferable to conduct an aging reaction after reacting at least one organic aluminum halide in an amount of X1/OR of from 0.2 to 0.4. Thereafter, in order to proceed with the halogenation, at least one organic aluminum halide is further reacted to obtain a solid catalyst component (A).

The solid catalyst component (A) thus obtained may be used for polymerization reaction without removing the remaining unreacted materials and by-products or after removing them by filtration or decantation.

The solid catalyst component (A) may be used for polymerization in a suspension state as it is, but it may be used after separation from a solvent or after heating under normal pressure or a reduced pressure to remove a solvent and to dry.

Examples of an organic aluminum compound used as a catalyst component (B) in the present invention include an aluminum compound having a $C_1$–$C_{20}$ linear or branched alkyl group. Typical examples include trimethylaluminum, triethylaluminum, tri-i-butylaluminum, tri-n-butylaluminum, tri-n-decylaluminum, and the like. Another example of the catalyst component (B) include an alkylmetal hydride having a $C_1$–$C_{20}$ alkyl group, the typical example of which includes diisobutylaluminum hydride. Still another example includes an alkylaluminum halide having a $C_1$–$C_{20}$ alkyl group such as ethylaluminum sesquichloride, diethylaluminum chloride and diisobutylaluminum chloride, or an alkylaluminum alkoxide having a $C_1$–$C_{20}$ alkyl group such as diethylaluminum ethoxide. Also, there can be used an organic aluminum compound (such as isoprenylaluminum) obtained by reaction of a $C_4$–$C_{20}$ diolefin with a dialkylaluminum hydride or trialkylaluminum having a $C_1$–$C_{20}$ alkyl group.

Polymerization of olefins in accordance with the present invention can be conducted under general reaction conditions of a Ziegler method. Thus, the polymerization can be conducted continuously or batch-wise at a temperature of from 20 to 110° C. Polymerization pressure is not especially limited, but it is suitable for conducting polymerization under a pressurized pressure, for example, of from 1.5 to 50 kg/cm² G. When polymerization is conducted in the presence of an inert solvent, any inert solvents generally used, are usable. Suitable examples include a $C_4$–$C_{20}$ alkane or cycloalkane such as isobutane, pentane, hexane and cyclohexane.

When polymerization is conducted in a gas phase in the absence of an inert solvent, the polymerization is conducted in the presence of an olefin gas at a temperature of lower than a melting point of a polymer product. Any type of reactors generally used in this technical field can be used in the polymerization step, the examples of which include a fluidized bed type reactor, a stirring tank type reactor, and the like. In the case of using the fluidized bed type reactor, polymerization is conducted while maintaining the reaction system in a fluidized state by blowing an olefin gas and/or an inert gas into the system. In the case of using the stirrer tank type reactor, various stirring machines such as an anchor type stirrer, a screw type stirrer and a ribbon type stirrer, can be used.

The catalyst component (A) of the present invention is used preferably in an amount of corresponding to from 0.001 to 2.5 mmol of titanium atom per liter of a solvent or a reactor, but can be used at a higher concentration depending on conditions.

The catalyst component (B) of at least one organic aluminum compound is used at a concentration of from 0.02 to 50 mmol, preferably from 0.2 to 5 mmol, per liter of a solvent or a reactor.

Examples of an olefin to be polymerized in accordance with a method for producing a polyolefin of the present invention include an α-olefin of the formula R—CH=CH₂ (wherein R is a hydrogen atom or a $C_1$–$C_{10}$, preferably $C_1$–$C_8$, linear or branched alkyl group which may be substituted). Typical examples of the α-olefin include ethylene, propylene, 1-butene, 1-pentene, 4-methyl-1-pentene, and 1-octene. Also, a mixture of two or more of the above a-olefins or a mixture of α-olefins with dienes such as butadiene or isoprene may be used for copolymerization. Particularly preferable starting materials include ethylene, a mixture of ethylene with α-olefins other than ethylene, and a mixture of ethylene with dienes.

The molecular weight of a polymer produced in the present invention can be controlled by a known method, e.g., by introducing an appropriate amount of hydrogen into the reaction system.

EXAMPLES

Now, the present invention will be described in further detail with reference to Examples. However, it should be understood that the present invention is by no means restricted by such specific Examples.

In the following Examples and Comparative Examples, HLMI/MI means a ratio of high load melt index (HLMI by ASTMD-1238 condition F) to melt index (MI by ASTMD-1238 condition E), and is a measure for a molecular weight distribution. If the HLMI/MI value is low, a molecular weight distribution is narrow.

An activity is expressed by an amount of a polymer product (g) per g of a catalyst component (A). The width of particle size distribution of polymer particles is expressed by a common logarithmic value (hereinafter referred to as "σ") obtained by classifying polymer particles with a sieve, plotting the result of the classification of the polymer particles on a probability logarithmic section paper and determining a geometric standard deviation value from the approximate line on the section paper by a known method. Also, an average particle size is a particle size corresponding to a weight integrated value 50% of the approximate line.

Example 1

(Preparation of solid catalyst component)

7.0 g (0.288 mol) of metallic magnesium powder and 39.0 g (0.115 mol) of titanium tetrabutoxide were charged in a 1 l glass flask equipped with a stirrer, and 44.8 g (0.60 mol) of n-butanol having 0.35 g of iodine dissolved therein was added thereto at 90° C. for 2 hours, and the resultant mixture was stirred at 140° C. for 2 hours under nitrogen sealing while removing hydrogen gas generated. After adjusting a temperature to 110° C., 6.2 (0.03 mol) of tetraethoxysilane and 4.6 g (0.03 mol) of tetramethoxysilane were further added thereto and the resultant mixture was stirred at 140° C. for 2 hours. Thereafter, 490 ml of hexane was added to the resultant mixture to obtain a homogeneous solution. The homogeneous solution thus obtained contained 1.3 mols of an alkoxy group.

100 g of the above prepared homogeneous solution (containing 0.068 mol of Mg and 0.31 mol of an alkoxy group) was placed in another 500 ml glass flask, and 40 ml of a hexane solution containing 0.054 mol of diethylaluminum chloride and 0.027 mol of i-butylaluminum dichloride (containing 0.108 mol of a halogen atom) was added thereto at 45° C., and the resultant mixture was stirred at 60° C. for 1 hour to precipitate particles (X1/OR=0.35). Thereafter, 70 ml of a hexane solution containing 0.19 mol of i-butylaluminum dichloride was further added thereto at 45° C. and the resultant mixture was stirred at 60° C. for 1 hour to further conduct halogenation (X2/OR=1.2), thus obtaining a solid catalyst component (A). The remaining unreacted reactants and by-products were removed by decantation with hexane, and the product thus obtained had a titanium content of 8.8 wt %.

(Polymerization of ethylene)

A stainless steel electromagnetic stirrer type autoclave having a capacity of 2 l was replaced well with nitrogen, and 1.2 l of hexane was charged therein and an internal temperature was adjusted to 80° C. Thereafter, 0.23 g (1.2 mmol) of tri-i-butylaluminum as a catalyst component (B) was added thereto, and a slurry containing 4.0 mg of the above prepared solid catalyst component (A) as then added thereto. After adjusting the internal pressure of the autoclave to 1 kg/cm² G, hydrogen was charged under a pressure of 4 kg/cm², and polymerization of ethylene was conducted for 1.5 hours by continuously charging ethylene into the autoclave so as to make the internal pressure 11.0 kg/cm² G. After polymerization, unreacted gas was removed to recover polyethylene, and the polyethylene was separated from the solvent by filtration and was dried.

In this manner, 310 g of a polyethylene having a melt index of 0.9 g/10 minutes, a HLMI/MI value of 33 and a bulk density of 0.43 g/cm³ was obtained. The amount of the polyethylene product (hereinafter referred to as "activity") was 78,000 g per g of the solid catalyst component (A), and the amount of titanium remaining in the polyethylene product was 1.1 ppm. Also, the polyethylene product had an average particle size of 290 μm and the content of fine particles of a particle size of less than 105 μ(hereinafter referred to as "fine particle content") was 0.6 wt %, and a was 0.08.

Comparative Example 1
(Preparation of solid catalyst component)

Unlike Example 1, aluminum halide treatment was conducted not by two steps but by one step to obtain a solid catalyst component. Thus, 100 g of the homogeneous solution (containing 0.068 mol of Mg and 0.31 mol of an alkoxy group) prepared in Example 1 was placed in a 500 ml glass flask, and 100 ml of a hexane solution containing 0.27 mol of i-butylaluminum dichloride (containing 0.54 mol of a halogen atom) was charged therein at 45° C., and the resultant mixture was stirred at 60° C. for 1 hour to obtain a solid catalyst component (X/OR=1.7). In the same manner as in Example 1, the remaining unreacted reactants and by-products were removed with hexane, and the product thus obtained had a titanium content of 9.2 wt %.

(Polymerization of ethylene)

Polymerization of ethylene was conducted in the same manner as in Example 1. Thus, 1.2 l of hexane was charged in a 2 l autoclave replaced well with nitrogen, and the internal temperature was adjusted to 80° C. Thereafter, 0.23 g (1.2 mmol) of tri-i-butylaluminum as a catalyst component (B) was added thereto and a slurry containing 8.0 mg of the above prepared solid catalyst component was then added thereto. After adjusting the internal pressure of the autoclave to 1 kg/cm² G, hydrogen was charged therein under a pressure of 4 kg/cm², and ethylene was continuously charged so as to make the internal pressure of the autoclave 11.0 kg/cm² G to conduct polymerization for 1.5 hours.

As a result, 223 g of polyethylene having a melt index of 0.6 g/10 minutes, a HLMI/MI value of 36 and a bulk density of 0.39 g/cm³ was obtained. The activity was 27,900 g/g, and was remarkably low as compared with Example 1. The amount of titanium remaining in the polyethylene product was relatively large, i.e. 3.3 ppm. Also, the polyethylene product had an average particle size of 320 μ, a fine particle content of 36 wt % and a σ value of 1.17. Thus, the product of this Comparative Example 1 contained a large amount of fine particles and a broad particle size distribution, and the powder properties were poor.

Comparative Example 2
(Preparation of solid catalyst component)

In Example 1, a solid catalyst component was obtained without precipitating particles (the former X1/OR value was 0). Thus, 100 g of a homogeneous solution (containing 0.068 mol of Mg and 0.31 mol of an alkoxy group) prepared in the same manner as in Example 1, was charged in a 500 ml glass flask, and 100 ml of a hexane solution containing 0.75 mol of tri-i-butylaluminum was added thereto at 45° C., and the resultant mixture was stirred at 60° C. for 1 hour. At this stage, the solution became black, but particles were not precipitated. Thereafter, 114 ml of a hexane solution containing 0.31 mol of i-butylaluminum dichloride (X:2/OR=2.5) was added thereto and the resultant mixture was stirred at 60° C. for 1 hour to obtain a solid catalyst component. The remaining unreacted reactants and by-products were removed by decantation with hexane, and the product thus obtained had a titanium content of 8.1 wt %.

(Polymerization of ethylene)

Polymerization of ethylene was conducted in the same manner as in Example 1. Thus, 1.2 l of hexane was charged in a 2 l autoclave replaced well with nitrogen, and the internal temperature was adjusted to 80° C. Thereafter, 0.23 g (1.2 mmol) of tri-i-butylaluminum as a catalyst component (B) was added thereto, and the slurry containing 8.0 mg of the above prepared solid catalyst component was then added thereto. After adjusting the internal pressure of the autoclave to 1 kg/cm² G, hydrogen was charged under a pressure of 4 kg/cm², and ethylene was continuously charged so as to make the internal pressure of the autoclave 11.0 kg/cm² G to conduct polymerization for 1.5 hours.

In this manner, 152 g of a polyethylene having a melt index of 0.5 g/10 minutes, a HLMI/MI value of 38 and a bulk density of 0.38 g/cm³ was obtained. The activity was 19,000 g/g. The polyethylene product thus obtained had an average particle size of 320 μ, a fine particle content of 4.0 wt % and a σ value of 0.17.

Comparative Example 3
(Preparation of solid catalyst component)

In Example 1, a solid catalyst component was obtained without precipitating particles (the former X1/OR value was 0.16). Thus, 100 g of a homogeneous solution (containing 0.068 mol of Mg and 0.31 mol of an alkoxy group) prepared in the same manner as in Example 1, was charged in a 500 ml glass flask, and 28 ml of a hexane solution containing 0.054 mol of diethylaluminum chloride was added thereto at 45° C., and the resultant mixture was stirred at 60° C. for 1 hour. At this stage, particles were not precipitated. Thereafter, 71 ml of a hexane solution containing 0.19 mol of i-butylaluminum dichloride (X2/OR=1.2) was added thereto and the resultant mixture was stirred at 60° C. for 1 hour to obtain a solid catalyst component. The remaining unreacted reactants and by-products were removed by decantation with hexane, and the product thus obtained had a titanium content of 8.3 wt %.

(Polymerization of ethylene)

Polymerization of ethylene was conducted in the same manner as in Example 1. Thus, 1.2 l of hexane was charged in a 2 l autoclave replaced well with nitrogen, and the internal temperature was adjusted to 80° C. Thereafter, 0.23 g (1.2 mmol) of tri-i-butylaluminum as a catalyst component (B) was added thereto, and the slurry containing 8.0 mg of the above prepared solid catalyst component was then added thereto. After adjusting the internal pressure of the autoclave to 1 kg/cm² G, hydrogen was charged under a pressure of 4 kg/cm², and ethylene was continuously charged so as to make the internal pressure of the autoclave 11.0 kg/cm²G to conduct polymerization for 1.5 hours.

In this manner, 206 g of a polyethylene having a melt index of 0.8 g/10 minutes, a HLMI/MI value of 34 and a bulk density of 0.38 g/cm³ was obtained. The activity was 25,800 g/g. The polyethylene product thus obtained had an average particle size of 650 A, a fine particle content of 10.4 wt % and a σ value of 0.48.

Comparative Example 4
(Preparation of solid catalyst component)

A solid catalyst component was prepared by making a X1/OR ratio larger than in Example 1 and larger than the claimed range of the present invention. Thus, 100 g of a homogeneous solution (containing 0.068 mol of Mg and 0.31 mol of an alkoxy group) prepared in the same manner as in Example 1 was charged in a 500 ml glass flask, and 45 ml of a hexane solution containing 0.082 mol of diethylaluminum chloride and 0.027 mol of i-butylaluminum dichloride (containing 0.136 mol of a halogen atom) was added thereto at 45° C., and the resultant mixture was stirred at 60° C. for 1 hour to precipitate particles (X1/OR=0.44). Thereafter, 74 ml of a hexane solution containing 0.20 mol of i-butylaluminum dichloride (X2/OR=1.3) was added thereto at 45° C., and the resultant mixture was stirred at 60° C. for 1 hour to obtain a solid catalyst component. The remaining unreacted reactants and by-products were removed with hexane in the same manner as in Example 1, and the product thus obtained had a titanium content of 9.0 wt %.

(Polymerization of ethylene)

Polymerization of ethylene was conducted in the same as in Example 1. Thus, 1.2 l of hexane was charged in a 2 l autoclave replaced well with nitrogen, and the internal temperature was adjusted to 80° C. Thereafter, 0.23 g (1.2 mmol) of tri-i-butylaluminum as a catalyst component (B) was added thereto, and a slurry containing 8.0 mg of the above prepared solid catalyst component was then added thereto. After adjusting the internal pressure of the autoclave to 1 kg/cm² G, hydrogen was charged under a pressure of 4 kg/cm², and polymerization of ethylene was conducted for 1.5 hours by continuously charging ethylene so as to make the internal pressure of the autoclave 11.0 kg/cm² G.

In this manner, 251 g of polyethylene having a melt index of 0.6 g/10 minutes, a HLMI/MI ratio of 36 and a bulk density of 0.43 g/cm³ was obtained. The activity was 31,400 g/g. The polyethylene product thus obtained had an average particle size of 320 A, a fine particle content of 0.7 wt % and a σ value of 0.10.

Example 2

(Preparation of solid catalyst component)

100 g of a homogeneous solution (containing 0.068 mol of Mg) prepared in the same manner as in Example 1 was charged in a 500 ml glass flask and 35 ml of a hexane solution containing 0.061 mol of diethylaluminum chloride and 0.020 mol of i-butylaluminum dichloride was added thereto at 45° C., and the resultant mixture was stirred for 1 hour (X1/OR=0.31). Thereafter, 61 ml of a hexane solution containing 0.19 mol of i-butylaluminum dichloride was added thereto, and the resultant mixture was stirred at 70° C. for 1 hour (X2/OR=1.2). The remaining unreacted reactants and by-products were removed with hexane in the same manner as in Example 1, and the product thus obtained had a titanium content of 9.4 wt %.

(Polymerization of ethylene)

Polymerization of ethylene was conducted in the same manner as in Example 1. Thus, polymerization was conducted at 80° C. by using 0.23 g (1.2 mmol) of tri-i-butylaluminum as a catalyst component (B) and 4 mg of the above prepared catalyst component (A).

In this manner, 265 g of a polyethylene having a melt index of 1.1 g/10 minutes, a HLMI/MI ratio of 29 and a bulk density of 0.44 g/cm³ was obtained. The activity was 66,200 g/g. The polyethylene product thus obtained had an average particle size of 230 μ, a fine particle content of 1.1 wt % and a σ value of 0.09.

Example 3

(Preparation of solid catalyst component)

2.4 g (0.10 mol) of metallic magnesium powder and 13.6 g (0.04 mol) of titanium tetrabutoxide were charged in a 500 ml glass flask equipped with a stirrer, and 15.6 (0.21 mol) of n-butanol having 0.1 g of iodine dissolved therein was added thereto at 90° C. for 2 hours, and the resultant mixture was stirred at 140° C. for 2 hours under nitrogen sealing. 3.5 g (0.05 mol) of dimethylpolysiloxane (200 centistokes) was then added thereto and the resultant mixture was stirred at 140° C. for 2 hours. Thereafter, 170 ml of hexane was added to obtain a homogeneous solution. The homogeneous solution thus obtained contained 0.37 mol of an alkoxy group.

157 ml of a hexane solution containing 0.067 mol of diethylaluminum chloride and 0.033 mol of i-butylaluminum dichloride (containing 0.133 mol of a halogen atom) was added at 45° C. to the above prepared homogeneous solution, and the resultant mixture was stirred at 60° C. for 1 hour to precipitate particles (X1/OR=0.36). Thereafter, 110 ml of a hexane solution containing 0.3 mol of i-butylaluminum dichloride was added at 45° C. thereto and the resultant mixture was stirred at 60° C. for 1 hour to conduct further halogenation (X2/OR=1.6) to obtain a solid catalyst component (A). The remaining unreacted reactants and by-products were removed by decantation with hexane, and the product thus obtained had a titanium content of 8.6 wt %.

(Polymerization of ethylene)

Polymerization of ethylene was conducted in the same manner as in Example 1. Thus, polymerization was conducted at 80° C. by using 4 mg of the above prepared catalyst component (A) and 0.23 g (1.2 mmol) of tri-i-butylaluminum as a catalyst component (B).

In this manner, 272 g of a polyethylene having a melt index of 1.0 g/10 minutes, a HLMI/MI ratio of 30 and a bulk density of 0.39 g/cm³ was obtained. The activity was 68,000 g/g. The polyethylene product thus obtained had an average particle size of 250 μ, a fine particle content of 1.0 wt % and a σ value of 0.12.

Examples 4 to 7

Respective solid catalyst components were prepared in the same manner as in Example 3, except that the reactants and the amounts shown in the following Table 1 were respectively used. Polymerization of ethylene was conducted in the same manner as in Example 1 by using the respective solid catalyst components, and the results are shown in the following Table 2.

| | Reactants used for preparing homogeneous solution | | | | | Aluminum halide in the former step | Aluminum halide in the latter step |
|---|---|---|---|---|---|---|---|
| | Mg | Butanol | Ti(OBu)₄ | Si compound | | X1/OR (mol) | X2/OR (mol) |
| | (mol) | (mol) | (mol) | Type | Mol | | |
| Example 3 | 0.1 | 0.21 | 0.04 | DMPS | 0.05 | 0.1    0.36 | 0.3    1.6 |
| Example 4 | 0.1 | 0.21 | 0.04 | TES | 0.03 | 0.12   0.33 | 0.25   1.0 |
| Example 5 | 0.1 | 0.21 | 0.04 | TMS | 0.03 | 0.12   0.33 | 0.25   1.0 |

-continued

| | Reactants used for preparing homogeneous solution | | | | | Aluminum halide in the former step | | Aluminum halide in the latter step | |
|---|---|---|---|---|---|---|---|---|---|
| | Mg | Butanol | Ti(OBu)$_4$ | Si compound | | | | | |
| | (mol) | (mol) | (mol) | Type | Mol | X1/OR | (mol) | X2/OR | (mol) |
| Example 6 | 0.1 | 0.21 | 0.04 | none | — | 0.06 | 0.28 | 0.35 | 1.9 |
| Example 7 | 0.1 | 0.22 | 0.025 | none | — | 0.06 | 0.24 | 0.35 | 2.2 |

Aluminum halide used in the former step is a 2:1 molar ratio mixture of diethylaluminum chloride and i-butylaluminum dichloride.
Aluminum halide used in the latter step is i-butylaluminum dichloride.
DMPS: Dimethylpolysiloxane (200 centistokes)
TES: Tetraethoxysilane
TMS: Tetramethoxysilane

TABLE 2

| | Yield (g) | Activity (g/g) | MI (g/10 min) | HLMI/MI | Bulk density (g/cm$^3$) | Average particle size ($\mu$) | Fine particle content | σ |
|---|---|---|---|---|---|---|---|---|
| Example 3 | 272 | 68000 | 1.0 | 30 | 0.39 | 250 | 1.0 | 0.12 |
| Example 4 | 284 | 71000 | 1.1 | 30 | 0.38 | 280 | 0.9 | 0.14 |
| Example 5 | 260 | 65000 | 1.2 | 31 | 0.41 | 300 | 0.8 | 0.14 |
| Example 6 | 300 | 75000 | 1.0 | 31 | 0.39 | 280 | 1.3 | 0.16 |
| Example 7 | 256 | 64000 | 0.8 | 40 | 0.37 | 220 | 1.6 | 0.17 |

Example 8
(Preparation of solid catalyst component)

34.0 g (0.30 mol) of magnesium ethylate and 40.8 g (0.12 mol) of titanium tetrabutoxide were charged in a 1 l glass flask equipped with a stirrer, and the resultant mixture was stirred at 140° C. for 3 hours. After adjusting a temperature to 110° C., 6.2 g (0.03 mol) of tetraethoxysilane and 4.6 (0.03 mol) of tetramethoxysilane were added thereto and the resultant mixture was stirred at 140° C. for 2 hours. Thereafter, 500 ml of hexane was added thereto to obtain a homogeneous solution. The homogeneous solution thus obtained contained 1.32 mol of an alkoxy group.

100 g of the above prepared homogeneous solution (containing 0.072 mol of Mg and 0.32 mol of an alkoxy group) were charged in a 500 ml glass flask, and 40 ml of a hexane solution containing 0.058 mol of diethylaluminum chloride and 0.029 mol of i-butylaluminum dichloride (containing 0.116 mol of a halogen atom) was added at 45° C., and the resultant mixture was stirred at 60° C. for 1 hour to precipitate particles (X1/OR=0.36). Thereafter, 74 ml of a hexane solution containing 0.20 mol of i-butylaluminum dichloride was added at 45° C., and the resultant mixture was stirred at 60° C. for 1 hour to conduct further halogenation (X2/OR=1.25) to obtain a solid catalyst component (A). The remaining unreacted reactants and by-products were removed by decantation with hexane, and the product thus obtained had a titanium content of 8.8 wt %.

(Polymerization of ethylene)

Polymerization of ethylene was conducted in the same manner as in Example 1. Thus, 1.2 l of hexane was charged in a 2 l autoclave replaced well with nitrogen, and the internal temperature was adjusted to 80° C. Thereafter, 0.23 g (1.2 mmol) of tri-i-butylaluminum as a catalyst component (B) was added, and a slurry containing 4.0 mg of the above prepared solid catalyst component was further added. After adjusting the internal pressure of the autoclave to 1 kg/cm$^2$ G, hydrogen was charged under a pressure of 4 kg/cm$^2$, and polymerization was conducted for 1.5 hours by continuously adding ethylene so as to make the internal pressure of the autoclave 11.0 kg/cm$^2$ G.

In this manner, 272 g of a polyethylene having a melt index of 1.1 g/10 minutes, a HLMI/MI ratio of 32 and a bulk density of 0.41 g/cm$^3$ was obtained. The activity was 68,000 g/g. The polyethylene product thus obtained had an average particle size of 260 $\mu$, a fine particle content of 0.8 wt % and a σ value of 0.11.

As described above, the present invention achieves the following remarkable effects.

i) The first effect is that the catalyst activity is very high. That is, the amount of a polymer obtained per unit weight of a solid catalyst component (A) is very large. Therefore, it is not necessary to remove a catalyst residue from a polymer product by means of a special step, and it is possible to avoid problems of coloring or degradation caused when molding the polymer. Also, since the amount of the solid catalyst component (A) used per unit weight of the polymer product is very small, a cost for the catalyst can be remarkably reduced, thus providing a method for producing a polyolefin at a low cost.

ii) The second effect is that powder properties of a polymer product are excellent. That is, the particle size distribution of the polymer product is very narrow, and a polymer having a large average particle size and a high bulk density can be obtained, since a fine particle content is small. Also, in the polymerization step, there is no problem that the polymer sticks to or deposits on a polymerization apparatus, and in the separation and drying steps, the polymer slurry can be easily separated and filtrated and there is no problem that fine particles of the polymer are scattered out of the system. Furthermore, since the fluidity is improved, the drying efficiency is also improved. In the transportation step, there is no problem of causing a bridge in a silo, and there is no trouble during transportation. Granulation can also be smoothly conducted. Since the particle size distribution of the polymer is narrow, uniform polymer particles can be obtained without producing particles of various particle sizes even when a polymer having a broader molecular weight distribution is obtained by multi-stage polymerization, and, therefore, the molded product obtained therefrom does not have defects including studs, unevenness or irregularity.

What is claimed is:

1. A method for producing a polyolefin, which comprises polymerizing or copolymerizing at least one olefin selected from the group consisting of ethylene and an α-olefin of the formula R—CH=CH$_2$ where R is a $C_1$–$C_8$ linear or branched alkyl group in the presence of a catalyst system comprising (A) a solid catalyst component of a titanium catalyst component obtained by reacting at least two different aluminum halide compounds with a homogeneous solution containing magnesium, titanium, alkoxy groups, and at least one linear polysiloxane or alkoxysilane, wherein the linear polysiloxane is selected from the group consisting of hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxypolysiloxane, diethoxypolysiloxane, and diphenoxypolysiloxane, which is a liquid with a viscosity at 25° C. of from 1 to 10,000 centistokes and where the alkoxysilane is selected from the group consisting of trimethylmethoxysilane, dimethyldiethoxysilane, methyltrimethoxysilane, tetramethoxysilane, tetraethoxysilane, diphenyldiethoxysilane, tetramethyldiethoxydisilane, and dimethyltetraethoxydisilane; wherein in a former step at least two different aluminum halide compounds are added to the homogeneous solution to provide halogen atom in a mol ratio of from 0.2 to 0.4 to one mol of the alkoxy groups contained in the homogeneous solution to precipitate particles in the former step, and wherein in a latter step the aluminum halide compound is further added to provide halogen atom in a mol ratio of from 1 to 20 to one mol of the alkoxy groups to treat the resultant mixture containing the precipitated particles in the latter step, and (B) at least one organic aluminum compound catalyst component;

wherein (A) the at least two different aluminum halide compounds used in the former step and the aluminum halide compound used in the latter step are selected from the group consisting of dimethylaluminum chloride, diethylaluminum chloride, dipropylaluminum chloride, ethylaluminum dichloride, i-butylaluminum dichloride, methylaluminum sesquichloride, ethylaluminum sesquichloride, i-butylaluminum sesquichloride and a mixture of triethylaluminum and aluminum trichloride; and the homogeneous solution containing magnesium, titanium, alkoxy groups and the at least one silicon compound is a solution containing (i) at least one member selected from the group consisting of (a) metallic magnesium and at least one alcohol selected from the group consisting of methanol, ethanol, n-propanol, i-propanol, n-butanol, i-butanol, n-hexanol, 2-ethyl hexanol, n-octanol, i-octanol, n-stearyl alcohol, cyclopentanol, cyclohexanol and ethylene glycol and (b) at least one oxygen-containing organic compound of magnesium which is a magnesium alkoxide selected from the group consisting of magnesium methylate, magnesium ethylate, magnesium isopropylate, magnesium decanolate, magnesium methoxyethylate and magnesium cyclohexanolate, and (ii) at least one oxygen-containing organic compound having the formula $[TiO_a(OR^1)_b]_m$ wherein $R^1$ is a $C_1$–$C_{20}$ hydrocarbon group, and a and b are numbers $0 \leq a \leq 1$ and b>0 which are compatible with the atomic valence of titanium, and m is an integer of $1 \leq m \leq 6$; and (B) the organic aluminum compound catalyst component is at least one member selected from the group consisting of a trialkyl aluminum compound having a $C_1$–$C_{20}$ alkyl group, an alkylaluminum hydride having a $C_1$–$C_{20}$ alkyl group, an alkylaluminum halide having a $C_1$–$C_{20}$ alkyl group and an organic aluminum compound obtained by reacting a trialkylaluminum or dialkylaluminum hydride having a $C_1$–$C_{20}$ alkyl group with a $C_4$–$C_{20}$ diolefin.

2. The method according to claim 1, wherein Mg/Ti atomic ratio in the homogeneous solution containing magnesium, titanium and alkoxy groups is in the range of $1/20 \leq Mg/Ti \leq 100$.

3. The method according to claim 1, wherein the polymerization of olefin is conducted at a temperature of from 20 to 110° C under a pressure of from 1.5 to 50 kg/cm$^2$ G.

4. The method according to claim 1, wherein said silicon compound is the linear polysiloxane.

5. The method according to claim 1, wherein said silicon compound is the alkoxysilane.

6. The method according to claim 1, wherein the Mg/Si atomic ratio in the homogeneous solution is in the range of $1/20 \leq Mg/Si < 100$.

* * * * *